T. B. DORNIN.
APPARATUS FOR TESTING FLUID METERS.
APPLICATION FILED MAY 15, 1908.
899,960.
Patented Sept. 29, 1908.
2 SHEETS—SHEET 1.
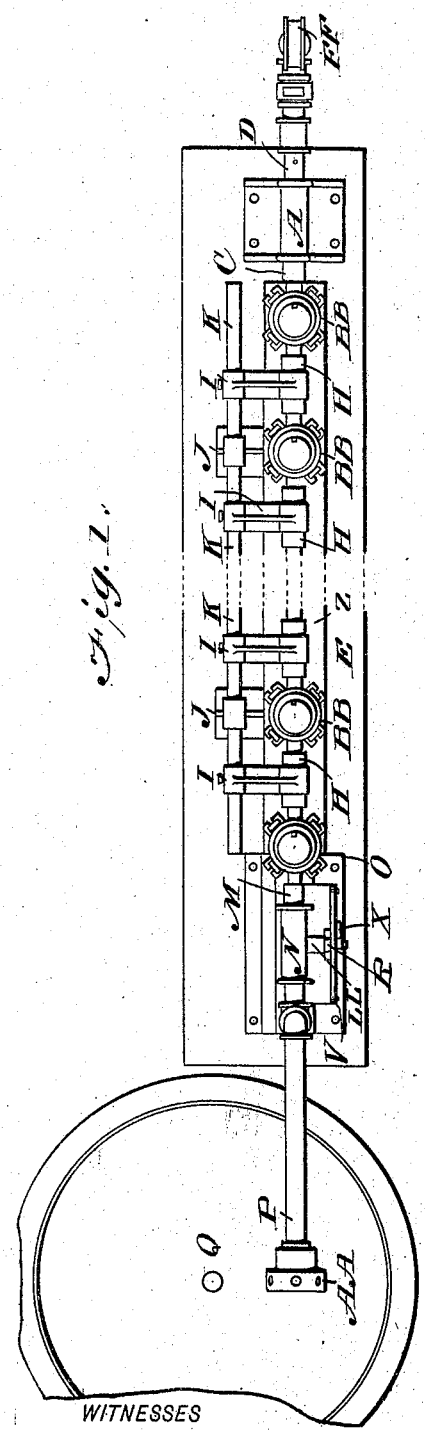
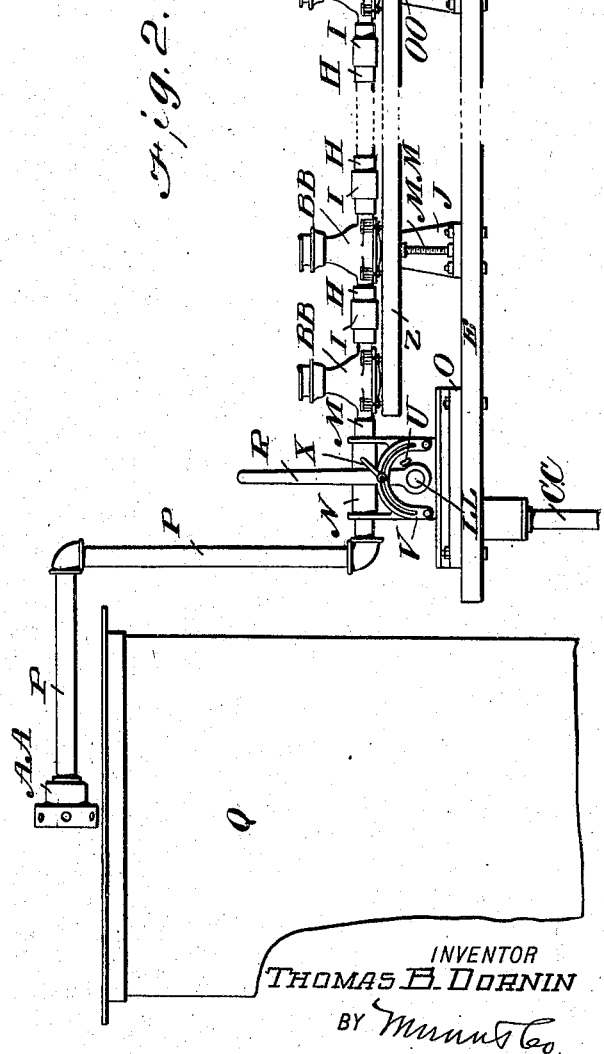
WITNESSES
INVENTOR
THOMAS B. DORNIN
BY
ATTORNEYS T. B. DORNIN.
APPARATUS FOR TESTING FLUID METERS.
APPLICATION FILED MAY 15, 1908.
899,960.
Patented Sept. 29, 1908.
2 SHEETS—SHEET 2.
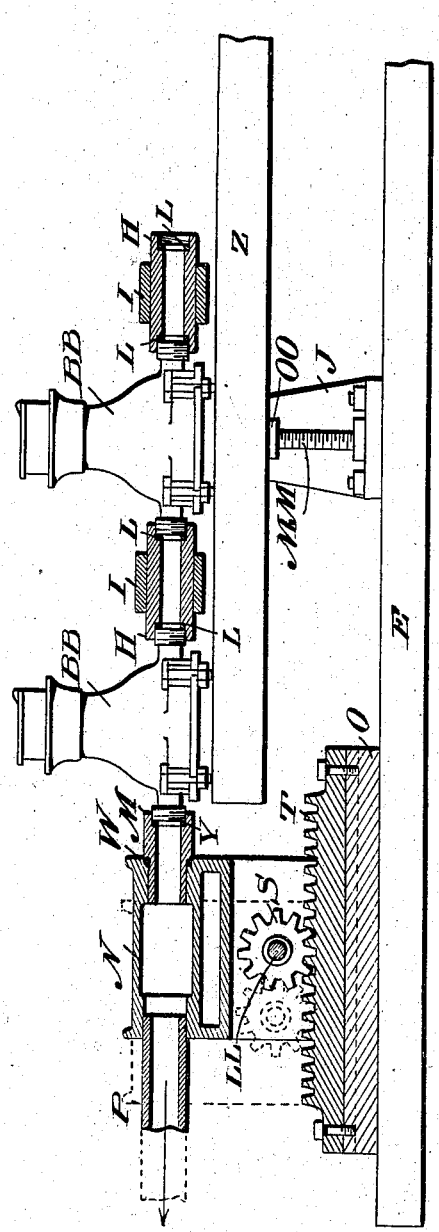
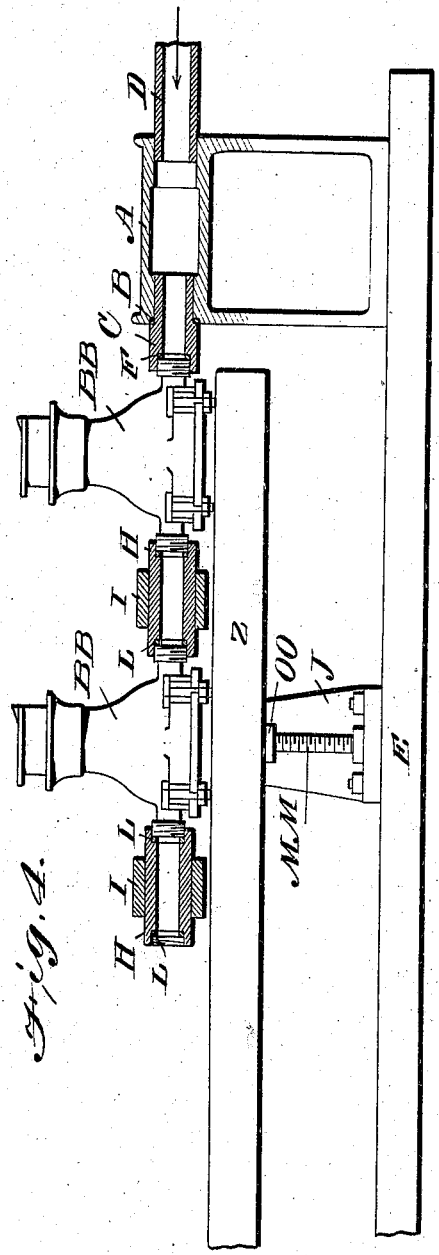
WITNESSES.
INVENTOR
THOMAS B. DORNIN
BY
ATTORNEYS

UNITED STATES PATENT OFFICE.

THOMAS B. DORNIN, OF NORFOLK, VIRGINIA, ASSIGNOR OF ONE-HALF TO JACOB M. UMSTADTER, OF NORFOLK, VIRGINIA.

APPARATUS FOR TESTING FLUID-METERS.

No. 899,960.  Specification of Letters Patent.  Patented Sept. 29, 1908.

Application filed May 15, 1908. Serial No. 432,974.

*To all whom it may concern:*

Be it known that I, THOMAS B. DORNIN, a citizen of the United States, residing at Norfolk, in the county of Norfolk and State of Virginia, have invented a new and useful Improvement in Apparatus for Testing Fluid-Meters, of which the following is a specification.

In the operation of testing fluid meters, such as water meters and the like, for the purpose of determining the accuracy, or estimating the error of the same, it is necessary to temporarily couple up the inflow and outflow nipples of the meter to a supply pipe, so that water taken from the supply pipe flows through the meter, registering on the dial the effect of its passage, and discharging thence into a measuring tank, the volume of water in which is then compared with the registration on the dial of the meter for determining its accuracy or error.

The fitting up of each meter to water tight connection with the supply pipe and measuring tank is, where a large number of meters are to be tested, a slow and tedious operation, and my invention is designed to provide an apparatus whereby a large number of meters may be simultaneously connected with tight joints to the supply pipe and measuring tank, and the meters all tested at once with a great saving of time and labor.

To that end my invention consists in the novel construction and arrangement of parts of a specially designed apparatus, as will be hereinafter more fully described with reference to the drawings, in which Figure 1 is a plan view, and Fig. 2 a side view with the middle part broken away. Fig. 3 is an enlarged vertical longitudinal section of the left hand, or delivery end, of the apparatus, with two of the meters in position, and Fig. 4 is a similar view of the supply end of the device.

The machine consists of a table E supported by legs CC, which rest on the floor or other supporting surface. At the supply end of the table is bolted a fixed bracket A, the top of which is hollow and is tapped, on the supply side, to take a supply pipe D, taking fluid under pressure from a supply pipe KK through a quick opening valve EE, the pipe KK being in connection with a supply main. On the discharge side of bracket A a removable sleeve C with an external shoulder is inserted and shoulders against the bracket A, the joint between bracket A and sleeve C being made water-tight by means of a washer B. Sleeve C is suitably recessed to take the spud or nipple of a meter BB, the joint between meter BB and sleeve C being made water tight by means of a washer F.

Between each pair of meters a longitudinally slidable sleeve H is supported by an arm I, which in turn is carried by a horizontal rod K, supported by brackets J, the arms I being held rigid on rod K by a set bolt through arm I, and the arms being longitudinally adjustable on said rod. The joints between the meter spuds and slidable sleeves are made water-tight by washers L. On the discharge side of the meter next to the discharge end of the testing machine a removable sleeve M with an external shoulder is supported by and shoulders against a longitudinally movable bracket N. The sleeve M is suitably recessed to take the spud of a meter BB, the joint between the meter spud and sleeve M being made water-tight by a washer Y, and the joint between sleeve M and bracket N being made water-tight by a washer W. All the sleeves are coaxially arranged and form through passages for the water.

Into the discharge side of bracket N a discharge pipe P is tapped, this pipe P leading up and over a tank Q, or other suitable measuring device, and having on its discharge end a discharge head AA, having suitable openings therein.

The bracket N is supported by and slidable longitudinally in a guide plate O, bolted to the table E, the bracket N being adjusted thereon by means of a pinion S carried by a shaft LL, journaled in bracket N, and engaging a rack T bolted to guide plate O. The pinion is rotated by a lever R, which is secured to and adjusted on shaft LL by a set bolt U seated into any one of a series of recesses in shaft LL. Lever R is secured in any desired position by means of a set lever X, which clamps lever R to an arch bar V, bolted to bracket N.

Before the meters BB are adjusted into the sleeves C, H and M, said meters are supported by means of a rest table Z, made vertically adjustable and which in turn is supported by adjusting rods MM, which are threaded into brackets J, and bear in sockets OO, above, secured to rest table Z.

Supply pipe D is provided with a drain valve DD for draining the meters and discharge pipe after testing. This drain valve is located between the clamping abutment and the water supply pipe.

The operation of my invention is as follows: Bracket N is first set back towards tank Q by means of lever R; sleeve H (next to sleeve C) is then moved in the direction of tank Q, and the first meter BB is inserted in sleeve C. Sleeve H is then slipped up on to the meter spud, and the next meter in line is then inserted in first sleeve H. The next sleeve H is then slipped up over the second meter spud, and the next meter in turn inserted until the last meter next to bracket N has been inserted. Bracket N is then moved towards the supply end of the machine, and is set up by lever R until sufficient pressure has been brought to bear upon all joints between the sleeves and meter spuds to make the same water-tight. Water is then let into and through the meters from supply pipe KK by means of valve EE. The tank Q is then balanced, meters read, and the desired stream turned on through discharge head AA. When the desired amount of water has been run into the tank, the discharge is cut off at head AA, and the final reading of all meters taken. The meters and discharge pipe are then drained by means of drain valve DD, the valve EE having been first shut off. Bracket N is then moved back towards the tank by means of lever R, and the meter next to bracket N is then taken out; the first sleeve next to discharge end is then slipped back, and the second meter removed, and so on until all meters are removed from the machine.

The important value of my invention is to be found in the coaxially alined slip sleeves H, by means of which any number of meters may be set in series and all joints between the meters and sleeves made water-tight at one operation through exerting pressure, by suitable means, on one end meter, the other end being held stationary by a suitable abutment.

The advantages claimed are that by one operation all joints between all meters and sleeves are made water-tight, thus obviating the necessity of separate operations for making the joints water-tight at each meter.

To accommodate meters of different sizes, the table screws M M provide for vertical variation and for horizontal variation, the sleeves C, H and M' are made in varying lengths interchangeably adjustable, longer sleeves being used for smaller meters.

I claim—

1. An apparatus for testing meters, comprising a series of longitudinally slidable sleeves, means for independently holding the same in coaxial alinement with spaces for the meters between, and means for clamping the inlet and outlet connections of a plurality of meters against the coaxially alined sleeves in alternating relation with the same.

2. An apparatus for testing meters, comprising a series of longitudinally slidable sleeves, means for holding the same in coaxial alinement and means for clamping the inlet and outlet connections of the meters against the coaxially alined sleeves, said means consisting of a stationary abutting bearing at one end and a longitudinally adjustable bearing at the other end having a passageway for the water through it and means for holding it to its longitudinal adjustment.

3. An apparatus for testing meters, comprising a series of longitudinally slidable sleeves, means for holding the same in coaxial alinement and means for clamping the inlet and outlet connections of the meters against the coaxially alined sleeves, said means consisting of a stationary abutment at one end and a longitudinally adjustable bearing at the other end arranged coaxially to the other sleeves and having a through passageway, and a rack and pinion for moving said adjustable bearing.

4. An apparatus for testing meters, comprising a series of longitudinally slidable sleeves, means for holding the same in coaxial alinement and means for clamping the inlet and outlet connections of the meters against the coaxially alined sleeves, said means consisting of a stationary abutment-bearing at one end, formed as a shouldered sleeve at the other end sleeve, a shouldered sleeve at the other end and means for bringing them together.

5. An apparatus for testing meters, comprising a rod having right angularly projecting arms bearing openings in their ends containing coaxially arranged and longitudinally slidable sleeves and means for clamping the inlet and outlet connections of the meters against the coaxially arranged sleeves.

6. An apparatus for testing meters, comprising a series of longitudinally slidable sleeves, means for holding the same in coaxial alinement and means for clamping the inlet and outlet connections of the meters against the coaxially alined sleeves, the clamping device having a passageway through it, and an inlet pipe with valve and an outlet drain pipe with valve arranged between the clamping device and the inlet pipe.

7. An apparatus for testing meters, comprising a plurality of intermediate coaxial and longitudinally adjustable sleeves adapted to connect the inlet and outlet connections of the meters, and coaxially arranged clamping devices having through passageways for the entry and escape of the fluid.

THOMAS B. DORNIN.

Witnesses:
J. M. UMSTADTER,
JOSEPH FANNING.